US012658154B2

(12) United States Patent
Dong et al.

(10) Patent No.: US 12,658,154 B2
(45) Date of Patent: Jun. 16, 2026

(54) VOLTAGE PROVIDING UNIT, VOLTAGE PROVIDING METHOD, DISPLAY DRIVING MODULE AND DISPLAY DEVICE

(71) Applicant: BOE Technology Group Co., Ltd., Beijing (CN)

(72) Inventors: Shuilang Dong, Beijing (CN); Ce Ning, Beijing (CN); Guangcai Yuan, Beijing (CN); Hehe Hu, Beijing (CN); Lizhong Wang, Beijing (CN); Nianqi Yao, Beijing (CN); Dapeng Xue, Beijing (CN); Liping Lei, Beijing (CN); Chen Xu, Beijing (CN); Dongfang Wang, Beijing (CN); Zhengliang Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 378 days.

(21) Appl. No.: 17/913,798

(22) PCT Filed: Sep. 24, 2021

(86) PCT No.: PCT/CN2021/120187
§ 371 (c)(1),
(2) Date: Sep. 22, 2022

(87) PCT Pub. No.: WO2023/044719
PCT Pub. Date: Mar. 30, 2023

(65) Prior Publication Data
US 2024/0212639 A1 Jun. 27, 2024

(51) Int. Cl.
*G09G 3/36* (2006.01)
*G09G 3/3266* (2016.01)
*G09G 3/20* (2006.01)

(52) U.S. Cl.
CPC ................. *G09G 3/36* (2013.01); *G09G 3/20* (2013.01); *G09G 3/3266* (2013.01);
(Continued)

(58) Field of Classification Search
CPC .......... G09G 3/36; G09G 3/3696; G09G 3/20; G09G 2310/0286; G09G 2310/0289;
(Continued)

(56) References Cited

U.S. PATENT DOCUMENTS

2014/0292395 A1* 10/2014 Wu ..................... H01L 29/7786
327/434
2017/0040897 A1* 2/2017 Zhang ................... H02M 3/156
(Continued)

FOREIGN PATENT DOCUMENTS

CN 102779478 A 11/2012
CN 109166600 A 1/2019
(Continued)

OTHER PUBLICATIONS

Shengyi, English translation for (CN 111429845) (Year: 2020).*
CN 202180002683.2 first office action dated Dec. 31, 2024.

*Primary Examiner* — William Boddie
*Assistant Examiner* — Saifeldin E Elnafia
(74) *Attorney, Agent, or Firm* — IPro, PLLC

(57) ABSTRACT

Voltage providing unit, voltage providing method, display driving module and display device are provided. The voltage providing unit, applied to a display panel, is configured to provide a control voltage signal for a driving circuit, and the voltage providing unit includes a buck circuit and a first electrical level converting circuit. The buck circuit is configured to receive a first voltage signal and perform a buck operation on the first voltage signal to obtain a second voltage signal; and the first electrical level converting circuit is connected to the buck circuit, and is configured to receive
(Continued)

an input control voltage, a third voltage signal and the second voltage signal, and to generate the control voltage signal in accordance with the input control voltage, the third voltage signal and the second voltage signal, a voltage value of the control voltage signal is less than a predetermined voltage value.

14 Claims, 5 Drawing Sheets

(52) U.S. Cl.
CPC ... *G09G 3/3696* (2013.01); *G09G 2310/0286* (2013.01); *G09G 2310/0289* (2013.01); *G09G 2310/061* (2013.01); *G09G 2310/062* (2013.01); *G09G 2330/021* (2013.01)

(58) Field of Classification Search
CPC ....... G09G 2310/061; G09G 2310/062; G09G 2330/021; G09G 3/3266
See application file for complete search history.

(56) References Cited

U.S. PATENT DOCUMENTS

| | | | | |
|---|---|---|---|---|
| 2020/0135287 | A1* | 4/2020 | Han ..................... | G09G 3/3677 |
| 2022/0383812 | A1* | 12/2022 | Zhu .......................... | H02H 3/08 |

FOREIGN PATENT DOCUMENTS

| | | | |
|---|---|---|---|
| CN | 111429845 | A | 7/2020 |
| JP | 2009015286 | A | 1/2009 |
| TW | 201509129 | A | 3/2015 |

* cited by examiner

VOLTAGE PROVIDING UNIT, VOLTAGE PROVIDING METHOD, DISPLAY DRIVING MODULE AND DISPLAY DEVICE

CROSS-REFERENCE TO RELATED APPLICATIONS

The present application is the U.S. national phase of PCT Application No. PCT/CN2021/120187 filed on Sep. 24, 2021, which is hereby incorporated by reference in its entirety.

TECHNICAL FIELD

The present disclosure relates to the field of display technology, and in particular, to a voltage providing unit, a voltage providing method, a display driving module and a display device.

BACKGROUND

A large-size display pane becomes popular due to its larger display area. Meanwhile, the oxide thin film transistor (Oxide TFT) is gradually applied to various display panels due to its technical advantage such as high mobility.

SUMMARY

In an aspect, an embodiment of the present disclosure provides a voltage providing unit, applied to a display panel, the voltage providing unit is configured to provide a control voltage signal for a driving circuit, the voltage providing unit includes a buck circuit and a first electrical level converting circuit:

the buck circuit is configured to receive a first voltage signal and perform a buck operation on the first voltage signal to obtain a second voltage signal; and the first electrical level converting circuit is connected to the buck circuit, and the first electrical level converting circuit is configured to receive an input control voltage, a third voltage signal and the second voltage signal, and to generate the control voltage signal in accordance with the input control voltage, the third voltage signal and the second voltage signal, a voltage value of the control voltage signal is less than a predetermined voltage value.

In a possible embodiment of the present disclosure, the buck circuit includes a switching unit, a storage unit and a flyback unit:

a first terminal of the switching unit is connected to an input node of the buck circuit, a second terminal of the switching unit is connected to a first node, and the switching unit is configured to transmit a signal inputted to the buck circuit to the storage unit in a case that the switching unit is turned on;

the storage unit is connected to the first node, a second node and an output node of the buck circuit, and the storage unit is configured to store and transmit a signal from the switching unit to the output node in the case that the switching unit is turned on, and to transmit the stored signal from the switching unit to the output node in a case that the switching unit is turned off; and the flyback unit is connected to the first node and the second node, and the flyback unit is configured to convert the signal stored in the storage unit into a current in a case that the switching unit is turned off.

In a possible embodiment of the present disclosure, the switching unit includes a control switching transistor, the control switching transistor has a control terminal, a first terminal and a second terminal, the control terminal of the control switching transistor is connected to a control signal terminal to obtain a control signal, the first terminal of the control switching transistor is connected to the input node, and the second terminal of the control switching transistor is connected to the first node:

the storage unit includes a first inductor and a first capacitor, one terminal of the first inductor is connected to the first node, the other terminal of the first inductor is connected to the output node, one terminal of the first capacitor is connected to the second node, and the other terminal of the first capacitor is connected to the output node;

the flyback unit includes a first diode, an anode of the first diode is connected to the second node, and a cathode of the first diode is connected to the first node; and the second node is grounded.

In a possible embodiment of the present disclosure, the predetermined voltage value is less than or equal to 27 V.

In a possible embodiment of the present disclosure, the predetermined voltage value ranges from 15 V to 26 V.

In another aspect, an embodiment of the present disclosure provides a voltage providing method, applied to the above-mentioned voltage providing unit, the voltage providing method includes:

receiving, by the buck circuit, the first voltage signal, and performing, by the buck circuit, the buck operation on the first voltage signal to obtain the second voltage signal; and receiving, by the first electrical level converting circuit, the input control voltage, the third voltage signal and the second voltage signal, and generating, by the first electrical level converting circuit, the control voltage signal in accordance with the input control voltage, the third voltage signal and the second voltage signal, the voltage value of the control voltage signal being less than the predetermined voltage value.

In a possible embodiment of the present disclosure, the control voltage signal is a square-wave voltage signal;

a high voltage value of the control voltage signal is a voltage value of the second voltage signal, a low voltage value of the control voltage signal is a voltage value of the third voltage signal, and the high voltage value of the control voltage signal is less than the predetermined voltage value.

In yet another aspect, the present disclosure provides in some embodiments a display driving module, including a driving circuit, a timing controller, a power source management integrated circuit and the above-mentioned voltage providing unit:

the timing controller is configured to provide the input control voltage;

the power source management integrated circuit is configured to provide the first voltage signal; and the voltage providing unit is configured to provide the control voltage signal to the driving circuit.

In a possible embodiment of the present disclosure, the display driving module further includes a second electrical level converting circuit, the second electrical level converting circuit is connected to the timing controller, the power source management integrated circuit and the driving circuit, and the second electrical level converting circuit is configured to receive a first timing control signal, a first driving control signal, the first voltage signal and the third voltage signal, to generate a second timing signal, a common signal and a second driving control signal, and transmit the second timing signal, the common signal and the second driving control signal to the driving circuit.

In a possible embodiment of the present disclosure, the driving circuit includes:

- an input sub-circuit, connected to an input signal terminal and a pull-up node, and the input sub-circuit is configured to transmit an input signal provided by the input signal terminal to the pull-up node under the control of the input signal terminal;
- a pull-down node control sub-circuit, connected to the input signal terminal, a first power source voltage signal terminal, the pull-up node, and a first pull-down node, and the pull-down node control sub-circuit is configured to transmit a power source voltage signal provided by the first power source voltage signal terminal to the first pull-down node under the control of the first power source voltage signal terminal and the pull-up node;
- an output sub-circuit, connected to the pull-up node, a clock signal terminal, the first pull-down node, a third voltage signal terminal and a first output signal terminal, the output sub-circuit is configured to transmit a clock signal provided by the clock signal terminal to the first output signal terminal under the control of the pull-up node, and to transmit the third voltage signal provided by the third voltage signal terminal to the first output signal terminal under the control of the first pull-down node;
- a noise reduction sub-circuit, connected to the pull-up node, the third voltage signal terminal, and the first pull-down node, and the noise reduction sub-circuit is configured to transmit the third voltage signal provided by the third voltage signal terminal to the pull-up node under the control of the first pull-down node; and
- a first reset sub-circuit, connected to the pull-up node, a first reset signal terminal, and the third voltage signal terminal, and the first reset sub-circuit is configured to transmit the third voltage signal provided by the third voltage signal terminal to the first pull-down node under the control of a reset signal provided by the first reset signal terminal.

In still yet another aspect, the present disclosure provides in some embodiments a display device, including the above-mentioned display driving module.

According to the embodiments of the present disclosure, the voltage providing unit applied to the display panel is configured to provide the control voltage signal for the driving circuit, and the voltage providing unit includes the buck circuit and the first electrical level converting circuit. The buck circuit is configured to receive the first voltage signal and perform the buck operation on the first voltage signal to obtain the second voltage signal; and the first electrical level converting circuit is connected to the buck circuit, and is configured to receive the input control voltage, the third voltage signal and the second voltage signal, and generate the control voltage signal in accordance with the input control voltage, the third voltage signal and the second voltage signal, so that the voltage value of the control voltage signal to be less than a predetermined voltage value. According to the embodiments of the present disclosure, by providing the buck circuit and the first electrical level converting circuit, the control on the electrical level of the control voltage signal can be realized and the influence of excessively high electrical level of the control voltage signal on the performance of the display panel can be reduced, thereby improving the reliability of the display panel.

BRIEF DESCRIPTION OF THE DRAWINGS

In order to illustrate the technical solutions of the embodiment of the present disclosure in a clearer manner, the drawings for the embodiment of the present disclosure will be described hereinafter briefly. Apparently, the following drawings merely relate to some embodiments of the present disclosure, and based on these drawings, a person skilled in the art may obtain the other drawings without any creative effort.

DETAILED DESCRIPTION

The technical solution of the present disclosure will be described hereinafter clearly and completely in conjunction with the drawings for embodiments of the present disclosure. Apparently, the following embodiments merely relate to a some, rather than all, of embodiments of the present disclosure. Based on these embodiments, all other embodiments, obtained by a person skilled in the art without any creative effort, also fall within the scope of the present disclosure.

A liquid crystal display panel (LCD) with amorphous silicon (a-Si) thin film transistors (TFTs) is gradually replaced by a LCD with Oxide TFTs due to its high mobility. However, compared with existing α-Si TFTs, Oxide TFTs have a relatively poor stability and yield.

In the process of implementing the technical solution of the present disclosure, the inventor of the present disclosure found that a display panel with large size, high resolution, and high refresh rate has a high requirement for the driving voltage. Many large-size display panels are driven by a Gate driver On Array (GOA, a driving circuit on array substrate, also referred to a row driver on array substrate when the driver is arranged in a row direction of the display panel), so as to achieve a display with a narrow frame and reduce cost. In the embodiments of the present disclosure, the driving circuit is exemplified as GOA.

In order to reduce signal attenuation and signal delay caused by large size and high resolution, the driving voltage is usually increased in the related art, for example, a high electrical level of the GOA in a certain display panel is above 30 V, and a low electrical level of the GOA is below −10 V.

When the requirements of the display panel are higher, such as larger size, higher refresh rate, or higher resolution, the driving voltage is further increased. For example, taking Oxide TFT 110-inch display panel with a resolution of 8000 and a refresh frequency of 120 Hz (8K 120 Hz) as an example, in order to reduce resistance capacitance (RC) delay, the driving voltage of the GOA is usually about 32 V for high voltage VGH and about −15 V for low voltage LVGL.

In embodiments of the present disclosure, the driving circuit in a display device may include a plurality of driving sub-circuits, the driving circuit may be, but not limited to, configured to provide a driving signal for a pixel circuit in an effective display region, and the driving signal may be, but not limited to, a gate driving signal or a light-emitting control signal.

The present disclosure provides in some embodiments a driving circuit.

Figure 1A:
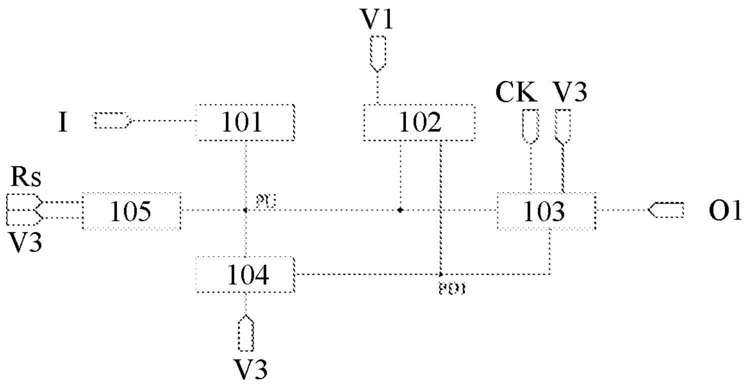
FIG. 1A is a circuit diagram of a driving circuit according to an embodiment of the present disclosure.

As shown in FIG. 1A, the driving circuit includes an input sub-circuit 101, a pull-down node control sub-circuit 102, an output sub-circuit 103, a noise reduction sub-circuit 104 and a first reset sub-circuit 105.

Figure 1B:
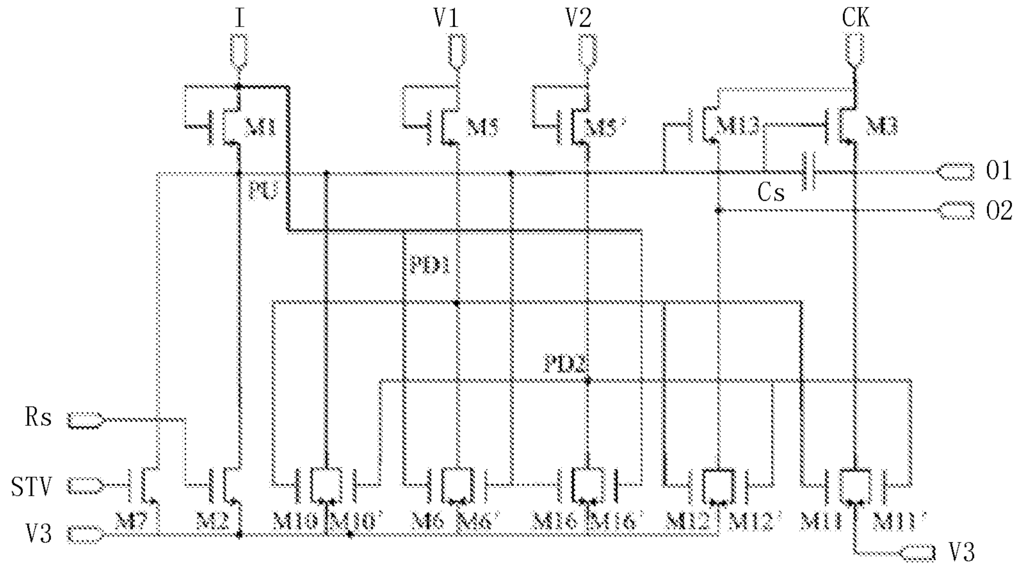
FIG. 1B is another circuit diagram of a driving circuit according to an embodiment of the present disclosure.

Further, as shown in FIG. 1A and FIG. 1B, in some embodiments of the present disclosure, the input sub-circuit 101 includes a first transistor M1, and the input sub-circuit 101 is connected to an input signal terminal I and a pull-up node PU. Specifically, a control electrode and a first electrode of the first transistor M1 are connected to the input signal terminal I, a second electrode of the first transistor M1 is connected to the pull-up node PU, and the input sub-circuit 101 is configured to transmit an input signal provided by the input signal terminal I to the pull-up node PU under the control of the input signal terminal I.

The pull-down node control sub-circuit 102 includes a fifth transistor M5, and the pull-down node control sub-circuit 102 is connected to a first power source voltage signal terminal V1, the pull-up node PU, and a first pull-down node PD1.

A control electrode and a first electrode of the fifth transistor M5 are connected to the first power source voltage signal terminal V1, and a second electrode of the fifth transistor M5 is connected to the first pull-down node PD1.

The pull-down node control sub-circuit 102 is configured to transmit a power source voltage signal provided by the first power source voltage signal terminal V1 to the first pull-down node PD1 under the control of the first power source voltage signal terminal V1 and the pull-up node PU.

In some embodiments of the present disclosure, the pull-down node control sub-circuit 102 further includes a first accessing unit, specifically, the first accessing unit includes a sixth transistor M6, and in some embodiments, the first accessing unit may further include an eighth transistor M6''.

A control electrode of the sixth transistor M6 is connected to the input signal terminal I, a first electrode of the sixth transistor M6 is connected to the first pull-down node PD1, and a second electrode of the sixth transistor M6 is connected to a third voltage signal terminal V3.

A control electrode of the eighth transistor M6' is connected to the pull-up node PU, a first electrode of the eighth transistor M6' is connected to the first pull-down node PD1, and a second electrode of the eighth transistor M6' is connected to the third voltage signal terminal V3.

The first accessing unit is capable of transmitting a third voltage signal provided by the third voltage signal terminal V3 to the first pull-down node PD1 under the control of the input signal terminal I. In this regard, a potential at the first pull-down node PD1 can be set to a low electrical level in a case that the input signal provided by the input signal terminal I is at a high electrical level, which is favorable for ensuring transistors in the noise reduction sub-circuit 104, the output sub-circuit 103, and a cascade sub-circuit which are connected to the third voltage signal terminal V3 to be turned off, thereby ensuring the normal operation of the circuit and improving the accuracy of the output signal.

In some embodiments of the present disclosure, the pull-down node control sub-circuit 102 further includes a fourth transistor M5', a control electrode and a first electrode of the fourth transistor M5' are connected to a second power source voltage signal terminal V2, and a second electrode of the fourth transistor M5' is connected to a second pull-down node PD2.

In some embodiments of the present disclosure, the pull-down node control sub-circuit 102 further includes a second accessing unit, specifically, the second accessing unit includes a sixteenth transistor M16, and the second accessing unit may further include a seventeenth transistor M16'.

A control electrode of the sixteenth transistor M16 is connected to the pull-up node PU, a first electrode of the sixteenth transistor M16 is connected to the second pull-down node PD2, and a second electrode of the sixteenth transistor M16 is connected to the third voltage signal terminal V3.

A control electrode of the seventeenth transistor M16' is connected to the input signal terminal I, a first electrode of the seventeenth transistor M16' is connected to the second pull-down node PD2, and a second electrode of the seventeenth transistor M16' is connected to the third voltage signal terminal V3.

Figure 2:
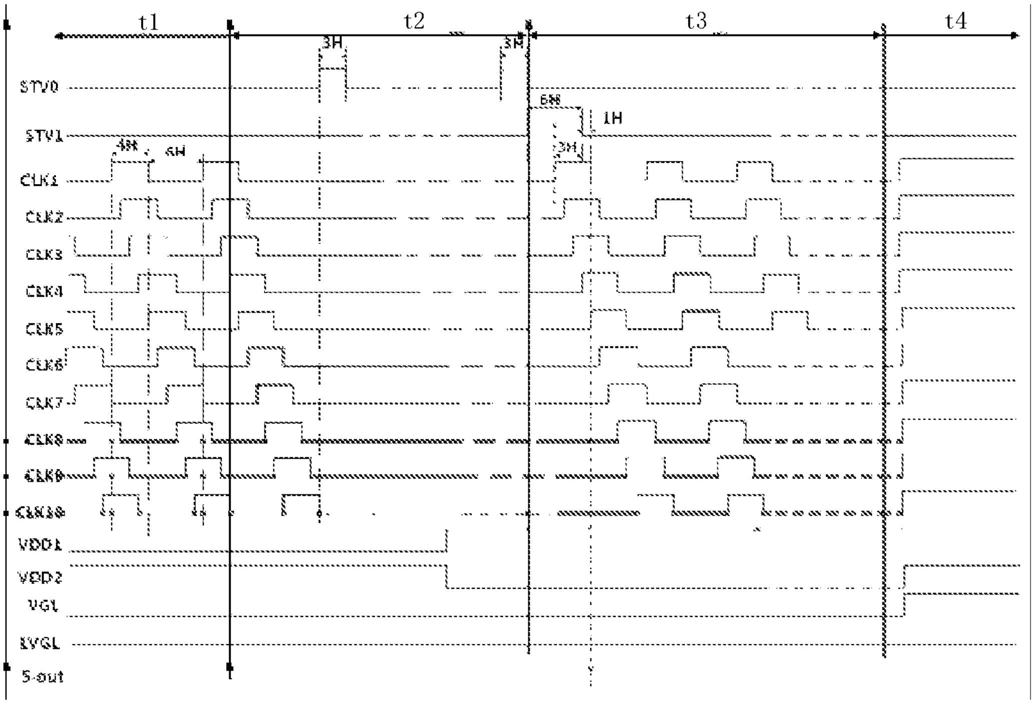
FIG. 2 is a driving timing diagram of the driving circuit as shown in FIG. 1B.

As shown in FIG. 2, when the first power source voltage signal terminal V1 provides a high electrical level, the second power source voltage signal terminal V2 provides a low electrical level, and when the first power source voltage signal terminal V1 provides a low electrical level, the second power source voltage signal terminal V2 provides a high electrical level. The first power source voltage signal terminal V1 and the second power source voltage signal terminal V2 are subjected to a switching of electrical level at a predetermined interval, so as to realize a control on the electrical levels of the first pull-down node PD1 and the second pull-down node PD2.

The output sub-circuit 103 includes a third transistor M3 and an eleventh transistor M11. The output sub-circuit 103 is connected to the pull-up node PU, a clock signal terminal CK, the first pull-down node PD1, the third voltage signal terminal V3 and a first output signal terminal O1.

A control electrode of the third transistor M3 is connected to the pull-up node PU, a first electrode of the third transistor M3 is connected to the clock signal terminal CK, and a second electrode of the third transistor M3 is connected to the first output signal terminal O1.

A control electrode of the eleventh transistor M11 is connected to the first pull-down node PD1, a first electrode of the eleventh transistor M11 is connected to the first output signal terminal O1, and a second electrode of the eleventh transistor M11 is connected to the third voltage signal terminal V3.

The output sub-circuit 103 may further include a fourteenth transistor M11', a control electrode of the fourteenth transistor M11' is connected to the second pull-down node PD2, a first electrode of the fourteenth transistor M11' is connected to the first output signal terminal O1, and a second electrode of the fourteenth transistor M11' is connected to the third voltage signal terminal V3.

The output sub-circuit 103 is configured to transmit a clock signal provided by the clock signal terminal CK to the first output signal terminal O1 under the control of the pull-up node PU, and to transmit the third voltage signal provided by the third voltage signal terminal V3 to the first output signal terminal O1 under the control of the first pull-down node PD1 or the second pull-down node PD2, so as to output the driving signal.

The noise reduction sub-circuit 104 includes a tenth transistor M10, and the noise reduction sub-circuit 104 is connected to the pull-up node PU, the third voltage signal terminal V3, and the first pull-down node PD1.

A control electrode of the tenth transistor M10 is connected to the first pull-down node PD1, a first electrode of the tenth transistor M10 is connected to the pull-up node PU, and a second electrode of the tenth transistor M10 is connected to the third voltage signal terminal V3.

In some embodiments of the present disclosure, the noise reduction sub-circuit 104 further includes a ninth transistor M10', a control electrode of the ninth transistor M10' is connected to the second pull-down node PD2, a first electrode of the ninth transistor M10' is connected to the pull-up node PU, and a second electrode of the ninth transistor M10' is connected to the third voltage signal terminal V3.

The noise reduction sub-circuit 104 is configured to transmit the third voltage signal provided by the third voltage signal terminal V3 to the pull-up node PU under the control of the first pull-down node PD1.

The first reset sub-circuit 105 includes a second transistor M2, and the first reset sub-circuit 105 is connected to the pull-up node PU, a first reset signal terminal Rs, and the third voltage signal terminal V3.

A control electrode of the second transistor M2 is connected to the first reset signal terminal Rs, a first electrode of the second transistor M2 is connected to the pull-up node PU, and a second electrode of the second transistor M2 is connected to the third voltage signal terminal V3.

The first reset sub-circuit 105 is configured to transmit the third voltage signal provided by the third voltage signal terminal V3 to the pull-down node under the control of a reset signal provided by the first reset signal terminal Rs.

In some embodiments of the present disclosure, the driving circuit may further include a cascade sub-circuit, as shown in FIG. 1B, the cascade sub-circuit includes a thirteenth transistor M13 and a twelfth transistor M12.

The cascade sub-circuit is connected to the pull-up node PU, the clock signal terminal CK, the first pull-down node PD1, the third voltage signal terminal V3 and a second output signal terminal O2.

Specifically, a control electrode of the thirteenth transistor M13 is connected to the pull-up node PU, a first electrode of the thirteenth transistor M13 is connected to the clock signal terminal CK, and a second electrode of the thirteenth transistor M13 is connected to the second output signal terminal O2.

A control electrode of the twelfth transistor M12 is connected to the first pull-down node PD1, a first electrode of the twelfth transistor M12 is connected to the second output signal terminal O2, and a second electrode of the twelfth transistor M12 is connected to the third voltage signal terminal V3.

In some embodiments of the present disclosure, the cascade sub-circuit further includes a fifteenth transistor M12', a control electrode of the fifteenth transistor M12' is connected to the second pull-down node PD2, a first electrode of the fifteenth transistor M12' is connected to the second output signal terminal O2, and a second electrode of the fifteenth transistor M12' is connected to the third voltage signal terminal V3.

The cascade sub-circuit is configured to transmit a clock signal provided by the clock signal terminal CK to the second output signal terminal O2 under the control of the pull-up node PU, and to transmit the third voltage signal provided by the third voltage signal terminal V3 to the second output signal terminal O2 under the control of the first pull-down node PD1, so as to output a carry control signal.

In some embodiments of the present disclosure, the driving circuit further includes a second reset sub-circuit, the second reset sub-circuit is configured to implement global reset of the cascade sub-circuit, the second reset sub-circuit includes a seventh transistor M7, a control electrode of the seventh transistor M7 is connected to a second reset control signal terminal STV, a first electrode of the seventh transistor M7 is connected to the pull-up node PU, and a second electrode of the seventh transistor M7 is connected to the third voltage signal terminal V3.

The second reset sub-circuit is configured to transmit the third voltage signal provided by the third voltage signal terminal V3 to the pull-up node PU under the control of a second reset control signal provided by the second reset control signal terminal STV, so as to pull down a potential at the pull-up node PU for resetting.

When the input signal enters from the input signal terminal I, the potential at the pull-up node PU is pulled up, a potential at the first pull-down node PD1 is pulled down by the sixth transistor M6, and when the potential at the pull-up node PU is pulled down by a reset signal of the second transistor M2, the potential at the first pull-down node PD1 is pulled up to a high potential again. Noise reduction for the pull-up node PU is performed by the tenth transistor M10, noise reduction for a first output signal G_out1 is performed by the eleventh transistor M11, and noise reduction for a second output signal G_out2 is performed by the twelfth transistor M12.

In the embodiments of the present disclosure, the control process for the second pull-down node PD2 is similar to the control process for the first pull-down node PD1. Therefore, in the embodiments of the present disclosure, merely the control process corresponding to the first pull-down node PD1 is illustrated as an example.

A pull-down node driving sub-circuit includes the fifth transistor M5, and the pull-down node driving sub-circuit is connected to the first power source voltage signal terminal V1, the second power source voltage signal terminal V2, the pull-up node PU, and the first pull-down node PD1.

The pull-down node driving sub-circuit is configured to transmit a first power source voltage signal provided by the first voltage signal terminal V1 to the first pull-down node PD1 under the control of the first voltage signal terminal V1 and the pull-up node PU.

Reference is further made to the driving timing diagram of the display substrate in FIG. 2. As shown in FIG. 2, STV0 and STV1 correspond to the second reset control signal provided by the second reset control signal terminal STV, CLK1 to CLK10 are clock signals provided by the clock signal terminal CK, VDD1 is a first control voltage signal provided by a voltage signal terminal V1, VDD2 is a second control voltage signal provided by a second voltage signal terminal V2, VGL and LVGL are voltage signals with a constant electrical level, S-out corresponds to the first output signal G_out1, a period t1 corresponds to an $N^{th}$ frame image, a period t3 corresponds to an N+1$^{th}$ frame image, a period t2 corresponds to a blank interval between the N$^{th}$ frame image and the N+1$^{th}$ frame image, and a period t4 corresponds to a period when the display panel is turned off.

As can be seen from FIG. 1B and FIG. 2, the fifth transistor M5 is turned on for a long time, so that the first pull-down node PD1 is at a high electrical level state for a long time, and the sixth transistor M6 and the sixteenth transistor M16 are subjected to a high voltage for a long time, specifically, a source electrode of the sixth transistor M6 is connected to a low electrical level of LVGL, a drain electrode of the sixth transistor M6 is connected to the first pull-down node PD1, and a gate electrode of the sixth transistor M6 is connected to a pulse signal at the pull-up node PU, in this regard, the sixth transistor M6 is prone to a failure. When the sixth transistor M6 fails, the potential at the first pull-down node PD1 may not be pulled down, and the potentials at the pull-up node PU, the first output signal G_out1 and the second output signal G_out2 may not be pulled up, resulting in an abnormal output.

Figure 3:
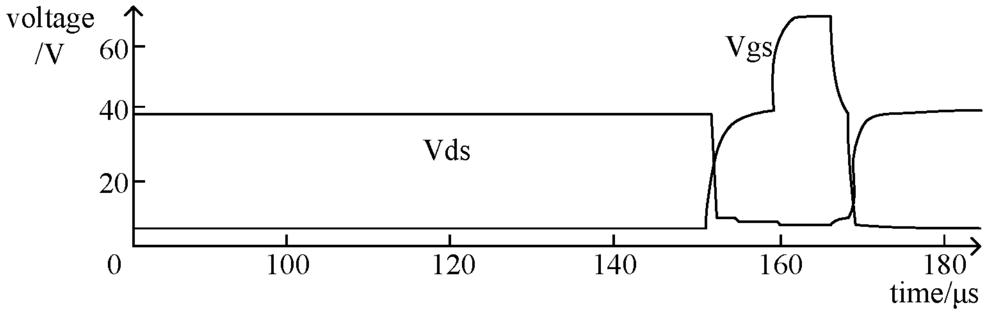
FIG. 3 is a schematic view showing a simulation of a transistor according to an embodiment of the present disclosure.
Figure 4:
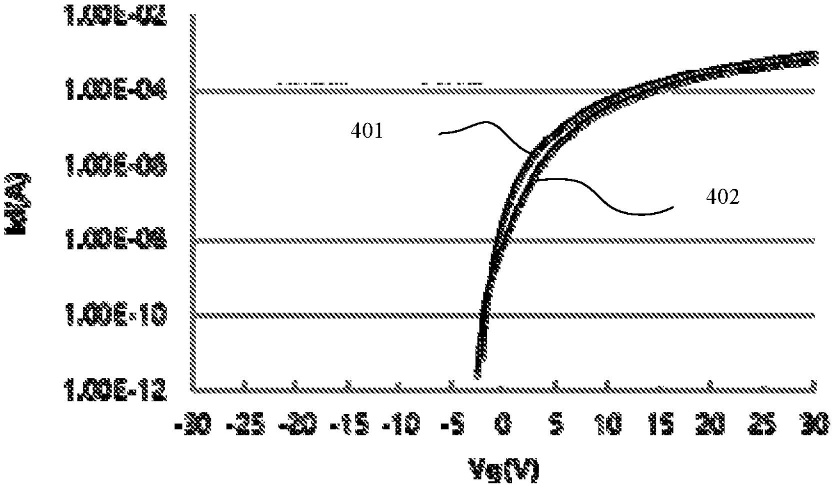
FIG. 4 is a curve diagram showing a relationship between an initial state and a failure state of a transistor according to an embodiment of the present disclosure.

FIG. 3 shows a simulation result for the sixth transistor M6, the horizontal axis represents time (μs), the vertical axis represents voltage (V), Vgs represents a voltage difference between the gate electrode of the sixth transistor M6 and the source electrode of the sixth transistor M6, Vds represents a voltage difference between the gate electrode of the sixth transistor M6 and the drain electrode of the sixth transistor M6. The gate electrode of M6 is the control electrode of the sixth transistors M6, one of the source electrode and the drain electrode of M6 is the first electrode of the sixth transistor M6, and the other of the source electrode and the drain electrode of M6 is the second electrode of the sixth transistor M6. FIG. 4 shows a curve representing a relationship between an initial state and a failure state of the sixth transistor M6, where the curve 401 corresponds to the initial state, and the curve 402 corresponds to the failure state. The horizontal axis Vg represents a threshold voltage (V), and the vertical axis Id represents a drain electrode current (A), i.e., on-state current. The sixth transistor M6 is vulnerable to the hot carrier effect, when the hot carrier effect occurs, the threshold voltage Vth has no significant shift, but the on-state current Ion is significantly attenuated, and the output capability is reduced.

Figure 5:
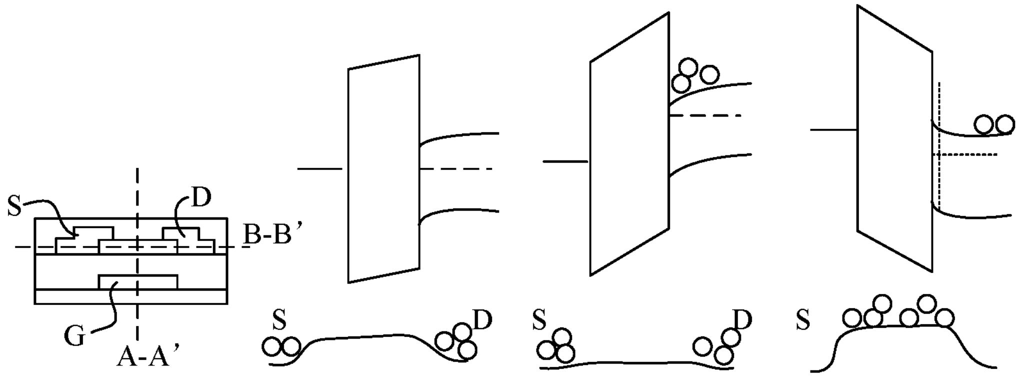
FIG. 5 is a schematic view showing a failure mechanism due to a hot carrier injection according to an embodiment of the present disclosure.

As shown in FIG. 5, the upper images of three states on the right corresponds to a cross section A-A', and the lower images of the three states on the right corresponds to a cross section B-B'. The damage caused by hot carrier injection at low temperature is more serious due to an increase of coulomb scattering. For an n-type indium gallium zinc oxide (IGZO) semiconductor, the lower the temperature is, the closer the Fermi level is to the conduction band, and the hot carrier-induced interface states close to the conduction band have a greater impact on the characteristics of the device: and thus transistors are more likely to fail at the low temperature. Compared with a conventional IGZO thin film transistor, the valence band is higher, and the Fermi level is closer to the conduction band, so that the hot carrier injection effect is more significant, and the device is more likely to fail due to the hot carrier effect.

In summary, the voltage applied to the sixth transistor M6 has the following characteristics: when Vgs is at a high electrical level and Vds is at a low electrical level, electrons are accumulated at an interface between the gate insulation layer and the IGZO at the source electrode terminal S and the drain electrode terminal D: when Vgs is at a low electrical level and Vds is at a high electrical level, electrons are discharged from the interface to the IGZO at the source electrode terminal S and the drain electrode terminal D, and the electrons gather at the source electrode terminal S under an electric field between the source electrode and the drain electrode; the electrons obtain high energy from the electric field and therefore hot carriers generate. In this regard, a defect may be generated at the interface between the semiconductor and the gate insulation layer, which may lead to degradation.

Figure 6:
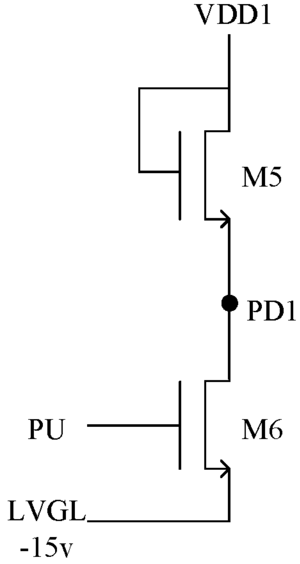
FIG. 6 is a circuit diagram of a test circuit according to an embodiment of the present disclosure.

As shown in FIG. 6, in the embodiments of the present disclosure, the connection relationship between the fifth transistor M5 and the sixth transistor M6 is simulated, and corresponding changing voltages for first power source voltage signal terminal V1 and the pull-up node PU, and a constant voltage LVGL of −15 V are provided.

The voltage of the pull-up node PU and the first power source voltage signal terminal V1 are adjusted, as shown in Table 1, the high electrical level and the low electrical level of the first power source voltage signal terminal V1 in an original signal are 32 V and −15 V, respectively, and the high electrical level and the low electrical level of the pull-up node PU are 40 V and −15 V, respectively. At this time, the measured high electrical level and low electrical level of the first pull-down node PD1 are 22 V and −10 V, respectively.

Reference is still made to Table 1, Experiment 2, when the high electrical level of the first power source voltage signal terminal V1 is changed to 20 V, it is found that the characteristics of the sixth transistor M6 have little change after the high electrical level of the first power source voltage signal terminal V1 is lowered.

Referring to Table 1, Experiment 3, when the high electrical level of the pull-up node PU is changed from 40 V to 28 V, there may be characteristics degradation on the sixth transistor M6. Therefore, it is proved that the damage to the sixth transistor M6 can be reduced through reducing the electrical level of the first power source voltage signal terminal V1.

TABLE 1 influence of the first power source voltage signal and the pull-up node voltage on the sixth transistor M6.

| Experimental conditions | | | Test results | | | | |
|---|---|---|---|---|---|---|---|
| | | | Ion@15 V | Ion@30 V | Vth (V) | Ion change percentage @15 V | Ion change percentage @15 V |
| Experiment 1 | Default state | Initial M6 | 185.25 | 1011.14 | 0.07 | | |
| | PU40V/−15 V | 5 minutes M6 | 75.07 | 648.93 | −0.28 | −59.48% | −35.82% |

TABLE 1-continued influence of the first power source voltage signal and the pull-up node voltage on the sixth transistor M6.

| Experimental conditions | | | Ion@15 V | Ion@30 V | Vth (V) | Ion change percentage @15 V | Ion change percentage @15 V |
|---|---|---|---|---|---|---|---|
| Experiment 2 | V1/LVGL 20 V/−10 V | Initial M6 | 182.26 | 1017.81 | −0.24 | | |
| | | 5 minutes M6 | 175.86 | 1004.77 | −0.79 | −3.51% | −1.28% |
| | | Initial M6 | 183.59 | 1025.68 | −1.40 | | |
| | | 60 minutes M6 | 176.03 | 1012.62 | −1.46 | −4.12% | −1.27% |
| Experiment 3 | PU28V/−15 V | Initial M6 | 177.67 | 1009.98 | −0.59 | | |
| | | 5 minutes M6 | 75.52 | 511.74 | −0.46 | −57.49% | −49.29% |

In order to obtain the voltage range of the first power source voltage signal provided by the first power source voltage signal terminal V1, in the embodiments of the present disclosure, different voltages for the first power source voltages signal are further set for testing.

Illustratively, as shown in Table 2, for a high mobility Oxide TFT with a band gap of 2.9e, when the first power source voltage signal is greater than 27 V, the attenuation of the sixth transistor M6 is significant, and the Ion attenuation of the sixth transistor M6 is about 40%, indicating that the hot carrier injection effect is significant for this condition. When the first power source voltage signal is reduced to be below 27 V, the Ion attenuation of the sixth transistor M6 is significantly reduced to about 15%, and is further reduced slightly through further reducing the voltage at the first power source voltage signal terminal V1.

TABLE 2 influence of different first power source voltage signals on the sixth transistor M6.

| Experimental conditions | | Ion@15 V | Ion@30 V | Vth (V) | Ion change percentage @15 V | Ion change percentage @15 V |
|---|---|---|---|---|---|---|
| V1 | Initial M6 | 182.3 | 1017.8 | −0.24 | | |
| 20 V | 5 minutes M6 | 175.9 | 1004.8 | −0.79 | −0.35% | −1.28% |
| V1 | Initial M6 | 185.1 | 1050.2 | −1.32 | | |
| 24 V | 5 minutes M6 | 169.0 | 972.8 | −0.94 | −8.71% | −7.38% |
| V1 | Initial M6 | 201.5 | 1051.6 | −2.62 | | |
| 25 V | 5 minutes M6 | 172.5 | 951.5 | −1.7 | −14.37% | −9.52% |
| V1 | Initial M6 | 196.0 | 1043.4 | −2.19 | | |
| 26 V | 5 minutes M6 | 158.1 | 891.4 | −0.86 | −19.36% | −14.57% |
| V1 | Initial M6 | 188.9 | 1024.5 | −2.22 | | |
| 27 V | 5 minutes M6 | 110.9 | 611.7 | −1.2 | −41.29% | −40.29% |
| V1 | Initial M6 | 172.5 | 1019.0 | −0.94 | | |
| 28 V | 5 minutes M6 | 102.8 | 631.8 | −0.73 | −40.42% | −38.00% |

TABLE 2-continued influence of different first power source voltage signals on the sixth transistor M6.

| Experimental conditions | | Ion@15 V | Ion@30 V | Vth (V) | Ion change percentage @15 V | Ion change percentage @15 V |
|---|---|---|---|---|---|---|
| V1 | Initial M6 | 185.2 | 1021.5 | −1.79 | | |
| 32 V | 5 minutes M6 | 97.6 | 617.3 | −0.49 | −47.31% | −39.57% |

Through the study done by the inventor, it is found that when the first power source voltage signal is reduced to be less than 26 V, the electric field intensity between the drain electrode terminal D and the gate electrode terminal decreases, and the hot carrier effect is not obvious.

Based on the above study, in order to enable a high voltage difference and a small delay for the output of GOA, the voltage difference between VGH and LVGL/VGL should be kept large, and the following technical solution is provided.

The present disclosure provides in some embodiments a voltage providing unit, applied to a display panel, and the voltage providing unit is configured to provide a control voltage signal for a driving circuit.

Figure 7:
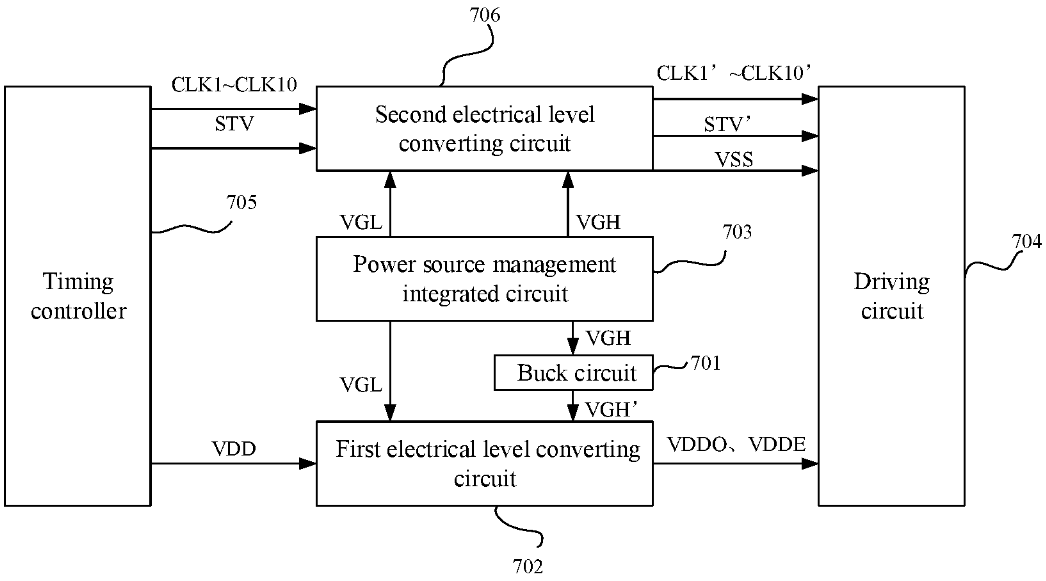
FIG. 7 is a schematic view showing a display driving module according to an embodiment of the present disclosure.

As shown in FIG. 7, in some embodiments of the present disclosure, the voltage providing unit includes a buck circuit 701 and a first electrical level converting circuit 702.

The buck circuit 701 is configured to receive a first voltage signal VGH and reduce the voltage of the first voltage signal VGH to obtain a second voltage signal VGH'.

The first electrical level converting circuit 702 is connected to the buck circuit 701, and the first electrical level converting circuit 702 is configured to receive an input control voltage VDD, a third voltage signal VGL and the second voltage signal VGH', and generate control voltage signals VDDO and VDDE in accordance with the input control voltage VDD, the third voltage signal VGL and the second voltage signal VGH', so that voltage values of the control voltage signals VDDO and VDDE are less than a predetermined voltage value.

The control voltage signals VDDO and VDDE here correspond to the first power source voltage signal provided by the first power source voltage signal terminal V1 and the second power source voltage signal provided by the second power source voltage signal terminal V2 in FIG. 1B, respectively.

In some embodiments of the present disclosure, the predetermined voltage value is less than or equal to 27 V. Further, the predetermined voltage value ranges from 15 V to 26 V. According to the results of the above experiments, by controlling the predetermined voltage value to be less than or equal to 27 V, the possible adverse effects on the transistor, e.g., the sixth transistor M6 can be reduced.

The first electrical level converting circuit 702 may be a level shifter. The first electrical level converting circuit 702 generates the control voltage signals VDDO and VDDE in accordance with the waveform of the input control voltage VDD signal provided by the timing controller 705 and high or low electrical levels of the third voltage signal VGL and the second voltage signal VGH'. The timing controller here may be a logic board TCON.

In the embodiments of the present disclosure, the buck circuit 701 may be a conventional or improved buck circuit 701, as long as it can lower down the voltage.

In the embodiments of the present disclosure, the buck circuit 701 includes a switching unit, a storage unit and a flyback unit.

Figure 8:
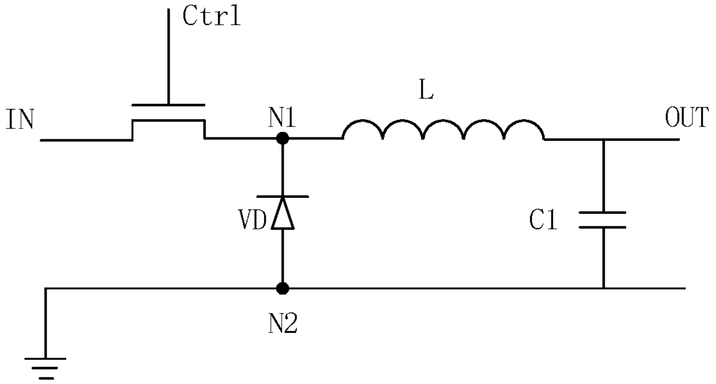
FIG. 8 is a circuit diagram of a buck circuit according to an embodiment of the present disclosure.

As shown in FIG. 8, a first terminal of the switching unit is connected to an input node 801 of the buck circuit 701, a second terminal of the switching unit is connected to a first node N1, and the switching unit is configured to transmit a signal inputted to the buck circuit 701 to the storage unit when the switching unit is turned on.

The storage unit is connected to the first node N1, a second node N2 and an output node 802 of the buck circuit 701, and the storage unit is configured to store a signal from the switching unit and transmit the same to the output node 802 when the switching unit is turned on, and to transmit the stored signal from the switching unit to the output node 802 when the switching unit is turned off.

The flyback unit is connected to the first node N1 and the second node N2, and the flyback unit is configured to convert the signal stored in the storage unit into a current when the switching unit is turned off, so as to maintain the continuity of the current.

In some embodiments of the present disclosure, the switching unit includes a control switching transistor T, the control switching transistor T has a control terminal, a first terminal and a second terminal. The control terminal of the control switching transistor T is connected to a control signal terminal Ctrl to obtain a control signal, the first terminal of the control switching transistor is connected to the input node 801, and the second terminal of the control switching transistor is connected to the first node N1.

The storage unit includes a first inductor L and a first capacitor C1, one terminal of the first inductor L is connected to the first node N1, and the other terminal of the first inductor L is connected to the output node 802, one terminal of the first capacitor C1 is connected to the second node N2, and the other terminal of the first capacitor C1 is connected to the output node 802. The flyback unit includes a first diode VD, an anode of the first diode VD is connected to the second node N2, and a cathode of the first diode VD being connected to the first node N1. The second node N2 is grounded.

With the buck circuit provided by the embodiments of the present disclosure, it is able to adjust the third voltage signal VGL with a higher electrical level to the second voltage signal VGH' with a lower electrical level, so that a voltage regulation can be realized.

The present disclosure further provides in some embodiments a voltage providing method, applied to the voltage providing unit in any of the embodiments.

In an embodiment, the method includes:

- receiving, by the buck circuit, the first voltage signal VGH, and lowering, by the buck circuit, a voltage of the first voltage signal VGH down to obtain the second voltage signal VGH';
- receiving, by the first electrical level converting circuit, the input control voltage VDD, the third voltage signal VGL and the second voltage signal VGH', and generating, by the first electrical level converting circuit, the control voltage signals VDDO and VDDE in accordance with the input control voltage VDD, the third voltage signal VGL and the second voltage signal VGH', so that the voltage values of the control voltage signals VDDO and VDDE are less than the predetermined voltage value.

In the embodiments of the present disclosure, the first electrical level converting circuit generates the control voltage signals VDDO and VDDE in accordance with the waveform of the input control voltage VDD signal provided by the timing controller and high or low electrical levels of the third voltage signal VGL and the second voltage signal VGH".

In some embodiments of the present disclosure, the control voltage signal is a square-wave voltage signal:

- high voltage values of the control voltage signals VDDO and VDDE are the voltage value of the second voltage signal VGH', low voltage values of the control voltage signals VDDO and VDDE are the voltage value of the third voltage signal VGL, and
- the high voltage values of the control voltage signals VDDO and VDDE are less than the predetermined voltage value.

In the embodiments of the present disclosure, the first voltage signal VGH and the third voltage signal VGL are both constant voltage signals, and accordingly, the second voltage signal VGH' obtained through buck operation performed on the first voltage VGH is also a constant voltage signal. During the adjustment process, the period and the duty ratio of the input control voltage signal VDD are kept unchanged, the high electrical level of the input control voltage signal VDD is adjusted based on the second voltage signal VGH', and the low electrical level of the input control signal VDD is adjusted based on the third voltage signal VGL, so as to obtain control voltage signals VDDO and VDDE.

In the embodiments of the present disclosure, the predetermined voltage value is less than or equal to 27V. Further, the predetermined voltage value ranges from 15V to 26V. By controlling the predetermined voltage value to be less than or equal to 27V, the possible adverse effects on the transistor, e.g., the sixth transistor M6 can be reduced.

In some embodiments of the present disclosure, the control voltage signals VDDO and VDDE have the same period and duty ratio as the input control voltage VDD.

By providing the buck circuit, it is able to reduce the high electrical level of the input control voltage VDD to obtain the control voltage signals VDDO and VDDE, so as to avoid possible adverse effects of the high electrical level on the transistor, e.g., the sixth transistor M6, thereby improving the reliability of the display panel.

The present disclosure provides in some embodiments a display driving module. As shown in FIG. 7, the display driving module includes a driving circuit 704, a timing controller 705, a power source management integrated circuit 703 and the above-mentioned voltage providing unit. The timing controller 705 is configured to provide the input control voltage VDD, the power source management integrated circuit 703 may be a Power Management IC (PMIC) and is configured to provide the first voltage signal VGH: and the voltage providing unit is configured to provide the control voltage signals VDDO and VDDE to the driving circuit 704.

In the embodiments of the present disclosure, the display driving module further includes a second electrical level converting circuit 706. When being applied to the driving circuit 704 in FIG. 1B, the second electrical level converting circuit 706 is configured to receive first timing control signals CLK1 to CLK10, a first driving control signal STVN, the third voltage signal VGL and the first voltage signal VGH, and to adjust electrical levels of the first timing control signals CLK1 to CLK10 and the first driving control signal STVN in accordance with the electrical levels of the first voltage signal VGH and the third voltage signal VGL, so as to obtain second timing control signals CLK1' to CLK10' and a second driving control signal STVN', and to output the same to the driving circuit 704. The second electrical level converting circuit 706 is further configured to provide a common voltage VSS to the driving circuit 704.

The first driving control signal STVN here refers to the above mentioned second reset control signal, e.g., STV0 and STV1 as shown in FIG. 2, and the third voltage signal VGL and the first voltage signal VGH correspond to the above signals with constant electrical levels.

In some embodiments of the present disclosure, the driving circuit 704 includes a pull-down node control sub-circuit, and the pull-down node control sub-circuit is connected to a control voltage terminal and the pull-down node, and the pull-down node control sub-circuit is configured to transmit the control voltage signals VDDO and VDDE from the control voltage terminal to the pull-down node.

In the embodiments of the present disclosure, high voltages of the control voltage signals VDDO and VDDE are relatively low, so it is able to avoid the influence of the high voltage on the transistor connected to the pull-down node. For example, the transistor may be the sixth transistor M6 in the driving circuit 704 in FIG. 1B, which is favorable for reducing the possibility of transistor failure, thereby improving the reliability of the display panel.

The present disclosure further provides in some embodiments a display device, including the above-mentioned display driving module.

The display device in the embodiments of the present disclosure includes all the technical solution of the above-mentioned display driving module, so as to at least achieve all the above-mentioned technical effects, and description of which is omitted herein.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display driving module, comprising: a driving circuit, a timing controller, a power source management integrated circuit and a voltage providing circuitry, wherein,
 the timing controller is configured to provide an input control voltage;
the power source management integrated circuit is configured to provide a first voltage signal; and
 the voltage providing circuitry comprising a buck circuit and a first electrical level converting circuit; wherein,
 the buck circuit is configured to receive the first voltage signal from the power source management integrated circuit and perform a buck operation on the first voltage signal to obtain a second voltage signal; and
 the first electrical level converting circuit is connected to the buck circuit, and is configured to receive the second voltage signal from the buck circuit; the first electrical level converting circuit is further configured to receive the input control voltage from the timing controller, and a third voltage signal from the power source management integrated circuit, and to generate a control voltage signal in accordance with the input control voltage from the timing controller, the third voltage signal from the power source management integrated circuit and the second voltage signal from the buck circuit, a voltage value of the control voltage signal being less than a predetermined voltage value, the predetermined voltage value being less than or equal to 27V;
 wherein
 the first electrical level converting circuit is configured to provide the control voltage signal to the driving circuit;
 wherein the display driving module further comprises a second electrical level converting circuit, the second electrical level converting circuit is connected to the timing controller, the power source management integrated circuit and the driving circuit, and the second electrical level converting circuit is configured to:
 receive a first timing control signal, a first driving control signal, the first voltage signal and the third voltage signal, to generate a second timing signal, a common signal and a second driving control signal, and
 transmit the second timing signal, the common signal and the second driving control signal to the driving circuit.

2. The display driving module according to claim 1, wherein the buck circuit comprises a switching sub-circuit, a storage sub-circuit and a flyback sub-circuit;
 a first terminal of the switching sub-circuit is connected to an input node of the buck circuit, a second terminal of the switching sub-circuit is connected to a first node, and the switching sub-circuit is configured to transmit a signal inputted to the buck circuit to the storage sub-circuit in a case that the switching sub-circuit is turned on;
 the storage sub-circuit is connected to the first node, a second node and an output node of the buck circuit, and the storage sub-circuit is configured to store and transmit a signal from the switching sub-circuit to the output node in the case that the switching sub-circuit is turned on, and to transmit the stored signal from the switching sub-circuit to the output node in a case that the switching sub-circuit is turned off; and
 the flyback sub-circuit is connected to the first node and the second node, and the flyback sub-circuit is configured to convert the signal stored in the storage sub-circuit into a current in the case that the switching sub-circuit is turned off.

3. The display driving module according to claim 2, wherein the switching sub-circuit comprises a control switching transistor, the control switching transistor has a control terminal, a first terminal and a second terminal, the control terminal of the control switching transistor is connected to a control signal terminal to obtain a control signal, the first terminal of the control switching transistor is connected to the input node, and the second terminal of the control switching transistor is connected to the first node;

the storage sub-circuit comprises a first inductor and a first capacitor, one terminal of the first inductor is connected to the first node, and the other terminal of the first inductor is connected to the output node, one terminal of the first capacitor is connected to the second node, and the other terminal of the first capacitor is connected to the output node;

the flyback sub-circuit comprises a first diode, an anode of the first diode is connected to the second node, and a cathode of the first diode is connected to the first node; and the second node is grounded.

4. The display driving module according to claim 1, wherein the predetermined voltage value ranges from 15V to 26V.

5. A voltage providing method, performed by the display driving module according to claim 1, comprising:

receiving, by the buck circuit from the power source management integrated circuit, the first voltage signal, and performing, by the buck circuit, the buck operation on the first voltage signal to obtain the second voltage signal;

receiving, by the first electrical level converting circuit, the input control voltage from the timing controller, the third voltage signal from the power source management integrated circuit and the second voltage signal from the buck circuit, and generating, by the first electrical level converting circuit, the control voltage signal in accordance with the input control voltage from the timing controller, the third voltage signal from the power source management integrated circuit and the second voltage signal from the buck circuit, the voltage value of the control voltage signal being less than the predetermined voltage value, the predetermined voltage value being less than or equal to 27V; and providing, by the first electrical level converting circuit, the control voltage signal to the driving circuit.

6. The voltage providing method according to claim 5, wherein the control voltage signal is a square-wave voltage signal, a high voltage value of the control voltage signal is a voltage value of the second voltage signal, a low voltage value of the control voltage signal is a voltage value of the third voltage signal, and the high voltage value of the control voltage signal is less than the predetermined voltage value.

7. The display driving module according to claim 1, wherein the driving circuit comprises:

an input sub-circuit, connected to an input signal terminal and a pull-up node, and the input sub-circuit is configured to transmit an input signal provided by the input signal terminal to the pull-up node under the control of the input signal terminal;

a pull-down node control sub-circuit, connected to the input signal terminal, a first power source voltage signal terminal, the pull-up node, and a first pull-down node, and the pull-down node control sub-circuit is configured to transmit a power source voltage signal provided by the first power source voltage signal terminal to the first pull-down node under the control of the first power source voltage signal terminal and the pull-up node;

an output sub-circuit, connected to the pull-up node, a clock signal terminal, the first pull-down node, a third voltage signal terminal and a first output signal terminal, the output sub-circuit is configured to transmit a clock signal provided by the clock signal terminal to the first output signal terminal under the control of the pull-up node, and to transmit the third voltage signal provided by the third voltage signal terminal to the first output signal terminal under the control of the first pull-down node;

a noise reduction sub-circuit, connected to the pull-up node, the third voltage signal terminal, and the first pull-down node, and the noise reduction sub-circuit is configured to transmit the third voltage signal provided by the third voltage signal terminal to the pull-up node under the control of the first pull-down node; and a first reset sub-circuit, connected to the pull-up node, a first reset signal terminal, and the third voltage signal terminal, and the first reset sub-circuit is configured to transmit the third voltage signal provided by the third voltage signal terminal to the pull-up node under the control of a reset signal provided by the first reset signal terminal.

8. The display driving module according to claim 7, wherein the pull-down node control sub-circuit comprises a fifth transistor and a sixth transistor;

a control electrode and a first electrode of the fifth transistor are connected to the first power source voltage signal terminal, and a second electrode of the fifth transistor is connected to the first pull-down node;

a control electrode of the sixth transistor is connected to the input signal terminal, a first electrode of the sixth transistor is connected to the first pull-down node, and a second electrode of the sixth transistor is connected to the third voltage signal terminal;

the first electrical level converting circuit is configured to provide the control voltage signal to the first power source voltage signal terminal; the power source voltage signal provided by the first power source voltage signal terminal is the control voltage signal; and the pull-down node control sub-circuit is configured to transmit the control voltage signal from the first power source voltage signal terminal to the first pull-down node under the control of the first power source voltage signal terminal and a pull-up node.

9. The display driving module according to claim 1, wherein the first electrical level converting circuit is configured to provide the control voltage signal to the driving circuit via a first power source voltage signal terminal.

10. A display device, comprising: a display driving module, the display driving module comprising a driving circuit, a timing controller, a power source management integrated circuit and a voltage providing circuitry, wherein, the timing controller is configured to provide an input control voltage;

the power source management integrated circuit is configured to provide a first voltage signal; and the voltage providing circuitry comprising a buck circuit and a first electrical level converting circuit; wherein, the buck circuit is configured to receive the first voltage signal from the power source management integrated circuit and perform a buck operation on the first voltage signal to obtain a second voltage signal; and the first electrical level converting circuit is connected to the buck circuit, and is configured to receive the second voltage signal from the buck circuit; the first electrical level converting circuit is further configured to receive the input control voltage from the timing controller, and a third voltage signal from the power source management integrated circuit, and to generate a control voltage signal in accordance with the input control voltage from the timing controller, the third voltage signal from the power source management integrated circuit and the second voltage signal from the buck circuit, a voltage value of the control voltage signal being less than a predetermined voltage value, the predetermined voltage value being less than or equal to 27V;

wherein the first electrical level converting circuit is configured to provide the control voltage signal to the driving circuit;

wherein the display driving module further comprises a second electrical level converting circuit, the second electrical level converting circuit is connected to the timing controller, the power source management integrated circuit and the driving circuit, and the second electrical level converting circuit is configured to:

receive a first timing control signal, a first driving control signal, the first voltage signal and the third voltage signal, to generate a second timing signal, a common signal and a second driving control signal, and transmit the second timing signal, the common signal and the second driving control signal to the driving circuit.

11. The display device according to claim 10, wherein the buck circuit comprises a switching sub-circuit, a storage sub-circuit and a flyback sub-circuit;

a first terminal of the switching sub-circuit is connected to an input node of the buck circuit, a second terminal of the switching sub-circuit is connected to a first node, and the switching sub-circuit is configured to transmit a signal inputted to the buck circuit to the storage sub-circuit in a case that the switching sub-circuit is turned on;

the storage sub-circuit is connected to the first node, a second node and an output node of the buck circuit, and the storage sub-circuit is configured to store and transmit a signal from the switching sub-circuit to the output node in the case that the switching sub-circuit is turned on, and to transmit the stored signal from the switching sub-circuit to the output node in a case that the switching sub-circuit is turned off; and the flyback sub-circuit is connected to the first node and the second node, and the flyback sub-circuit is configured to convert the signal stored in the storage sub-circuit into a current in the case that the switching sub-circuit is turned off.

12. The display device according to claim 11, wherein the switching sub-circuit comprises a control switching transistor, the control switching transistor has a control terminal, a first terminal and a second terminal, the control terminal of the control switching transistor is connected to a control signal terminal to obtain a control signal, the first terminal of the control switching transistor is connected to the input node, and the second terminal of the control switching transistor is connected to the first node;

the storage sub-circuit comprises a first inductor and a first capacitor, one terminal of the first inductor is connected to the first node, and the other terminal of the first inductor is connected to the output node, one terminal of the first capacitor is connected to the second node, and the other terminal of the first capacitor is connected to the output node;

the flyback sub-circuit comprises a first diode, an anode of the first diode is connected to the second node, and a cathode of the first diode is connected to the first node; and the second node is grounded.

13. The display device according to claim 10, wherein the predetermined voltage value ranges from 15V to 26V.

14. The display device according to claim 10, wherein the driving circuit comprises a pull-down node control sub-circuit, the pull-down node control sub-circuit comprises a fifth transistor and a sixth transistor;

a control electrode and a first electrode of the fifth transistor are connected to a first power source voltage signal terminal, and a second electrode of the fifth transistor is connected to a first pull-down node;

a control electrode of the sixth transistor is connected to an input signal terminal, a first electrode of the sixth transistor is connected to the first pull-down node, and a second electrode of the sixth transistor is connected to a third voltage signal terminal;

the first electrical level converting circuit is configured to provide the control voltage signal to the first power source voltage signal terminal; and the pull-down node control sub-circuit is configured to transmit the control voltage signal from the first power source voltage signal terminal to the first pull-down node under the control of the first power source voltage signal terminal and a pull-up node.

* * * * *